United States Patent [19]

Aufderheide et al.

[11] 4,011,438

[45] Mar. 8, 1977

[54] SIMPLIFIED DIGITAL MOVING TARGET INDICATOR FILTER

[75] Inventors: Maurice Bernard Aufderheide; Guy Vernon Morris, both of Scottsdale, Ariz.

[73] Assignee: Motorola, Inc., Chicago, Ill.

[22] Filed: Dec. 17, 1975

[21] Appl. No.: 641,392

[52] U.S. Cl. .............................. 235/152; 235/156; 328/167; 343/5 DP; 343/7.7
[51] Int. Cl.² ................... G01S 9/42; G06F 15/34
[58] Field of Search ......... 235/152, 156; 343/5 DP, 343/7.7; 328/167

[56] References Cited

UNITED STATES PATENTS

| | | | |
|---|---|---|---|
| 3,522,546 | 8/1970 | Jackson et al. | 328/167 |
| 3,737,900 | 6/1973 | Vehrs, Jr. | 343/7.7 X |
| 3,778,828 | 12/1973 | McFarland | 343/7.7 |
| 3,797,016 | 3/1974 | Martin | 343/5 DP X |
| 3,797,017 | 3/1974 | Taylor, Jr. | 343/7.7 |
| 3,877,011 | 4/1975 | Holberg et al. | 343/7.7 |
| 3,914,763 | 10/1975 | Green et al. | 235/152 X |

OTHER PUBLICATIONS

W. Roecker, "The Application of Digital Filters for Moving Target Indication", *IEEE Trans. on Audio and Electroacoustics*, 3-1971, pp. 72-77.

*Primary Examiner*—Jerry Smith
*Attorney, Agent, or Firm*—Eugene A. Parsons

[57] ABSTRACT

A digital filter for generating a frequency domain output signal in response to an incoming signal arriving in successive receiving cycles whenever the incoming signal has any frequency component lying within the passband of the filter. A means for generating a timing signal is provided. An analog-to-digital converter responsive to the timing signal converts the incoming analog signal into a series of digital input pulses during each range gate interval. A reference generator responsive to the timing signal provides a train of digital reference pulses for each of the successive receiving cycles. A predetermined number of successive receiving cycles constitutes a single correlation frame. The amplitude of each train of digital reference pulses is determined by a composite correlation function. A multiplier multiplies each digital reference pulse with each digital input pulse to generate a train of discrete digital output pulses for each receiving cycle. An accumulator stores the discrete digital output pulses from the multiplier and generates a frequency domain output signal for each frame of reference pulses. The digital filter can also be constructed with either a two-channel or four-channel processor to provide a more sophisticated filter system.

9 Claims, 7 Drawing Figures

| PULSE NUMBER | SHIFT REGISTER CONTENT | | | |
|---|---|---|---|---|
| | BIN 1 | BIN 2 | . . . | BIN 20 |
| TP1 | RG1·R1 | RG2·R1 | . . . | RG20·R1 |
| TP2 | + RG1·R2 | + RG2·R2 | | + RG20·R2 |
| ⋮ | + ⋮ + | + ⋮ + | | + ⋮ + |
| TP64 | RG1·R64 | RG2·R64 | . . . | RG20·R64 |

4,011,438

SIMPLIFIED DIGITAL MOVING TARGET INDICATOR FILTER

BACKGROUND OF THE INVENTION

The invention relates to filters and more particularly, to digital filters which can be used with a radar moving target indicator (MTI).

The purpose of an MTI filter is to ascertain whether or not a target detected by the radar receiver is traveling either toward or away from the radar receiver at a velocity greater than a certain minimum threshold velocity. The MTI filter eliminates from the MTI display targets which are either not moving or have a very low velocity with respect to the radar antenna. Prior art digital filters accomplished this task by performing a series of correlation functions on the incoming radar signal. To perform N correlation functions prior art digital filters required N reference generators, N multipliers and N integrators connected in parallel paths, each of which analyzed a separate frequency spectrum of the incoming signal. If it were desired to broaden the frequency band covered by the filter an additional separate filter would have to be added to the existing filter bank. Expanding the bandwidth of a digital filter in this manner greatly increases the complexity of the circuit.

The present invention completely avoids this complex circuit arrangement by performing N correlation functions in a circuit containing a single reference generator, a single multiplier and a single integrator.

An additional difficulty with prior art filters was the occasional inability to detect a moving target having a Doppler shift frequency lying within the bandpass of the filter bank due to a quadrature phase relationship between the phase angle of the specific reference generator signal and the phase angle of the signal reflected from a radar target. The present invention avoids this problem by providing a second filter channel having a reference generator signal shifted 90° in phase from the other filter channel reference generator signal so that an unknown incoming signal can never be in quadrature with both channels of this digital MTI filter.

Additionally, prior art filters produced a characteristic frequency response wherein the first side lobe was only 13 dB below the peak response. Subsequent side lobes decreased very slowly with frequency. This filter characteristic is unacceptable for most MTI applications. The digital MTI filter of the present invention produces a response curve having substantially reduced side lobes and far steeper filter skirts thereby providing greatly increased selectivity.

SUMMARY OF THE INVENTION

It is an object of this invention to provide a two channel digital filter requiring only two reference generators, two multipliers and two integrators.

Another object of this invention is to provide a single reference generator capable of providing a single correlation signal derived by summing N desired discrete correlation frequencies.

A further object of this invention is to provide a reference generator which utilizes a single read only memory to generate the desired output waveform.

Still another object of this invention is to provide a digital filter having a real channel and a quadrature channel such that the unknown incoming signal will never be undetectable due to a quadrature phase relationship with both reference generator signals of the digital filter.

Briefly stated, and in accord with one embodiment of the invention, a digital filter is provided for generating a frequency domain output signal in response to an incoming signal whenever the incoming signal has any frequency component within the pass-band of the digital filter. The digital filter includes means for generating a timing signal. An analog-to-digital converter responsive to the timing signal converts the incoming analog signal into a series of digital input pulses during each of a series of range gate intervals. A reference generator responsive to the timing signal provides a train of digital reference pulses for each of a successive series of receiving cycles. A predetermined number of successive receiving cycles form one complete correlation frame. The amplitude of each train of digital reference pulses is determined by a composite correlation function. Each digital reference pulse is multiplied with each digital input pulse to generate a train of discrete digital outputs for each receiving cycle. An accumulator responsive to the timing signal accumulates and stores the discrete digital outputs from the multiplier and generates a frequency domain output signal for each frame of digital reference pulses.

BRIEF DESCRIPTION OF THE DRAWINGS

The invention is pointed out with particularity in the appended claims, however, other objects and advantages, together with the operation of the invention, may be better understood by reference to the following detailed description taken in connection with the following illustrations wherein:

DETAILED DESCRIPTION OF THE INVENTION

In order to better illustrate the advantages of the invention and its contribution to the art, a preferred hardware embodiment of the invention will now be described in some detail.

Figure 1:
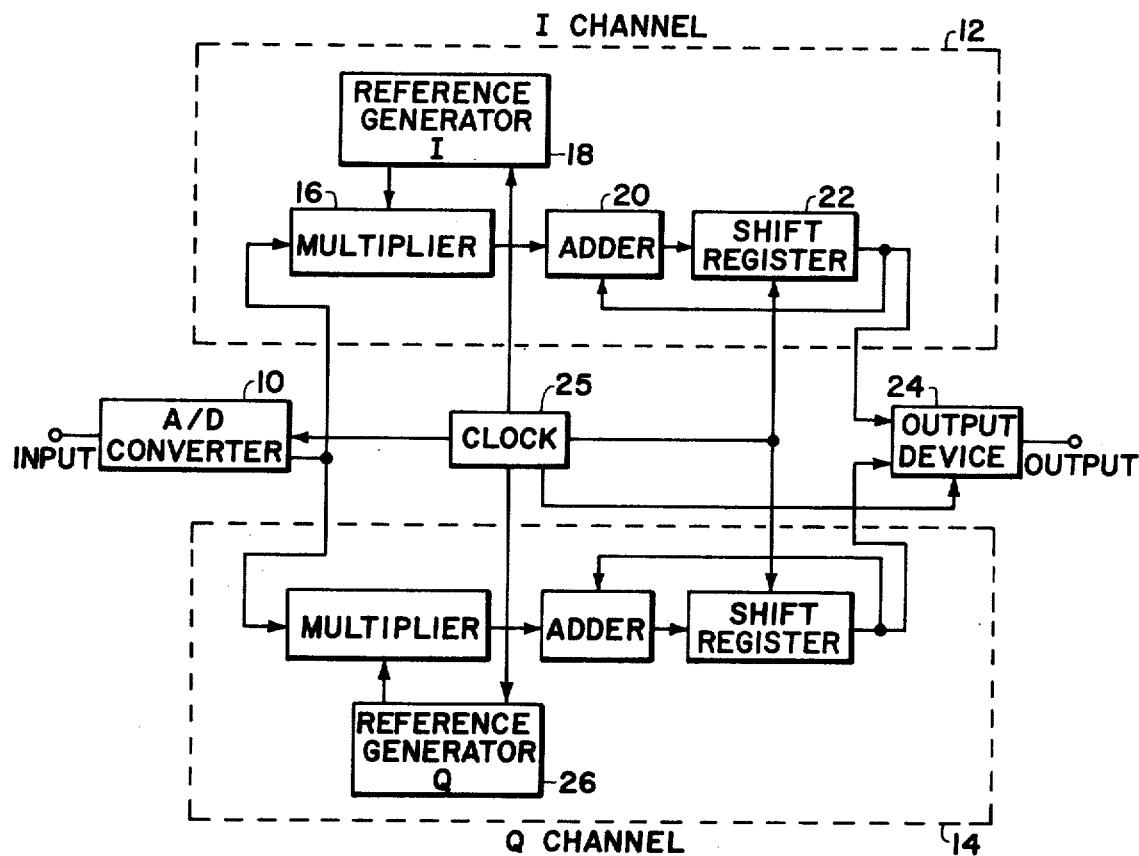
FIG. 1 is a generalized block diagram of one possible hardware embodiment of the invention.

The digital moving target indicator (MTI) filter in accordance with the invention, as illustrated in FIG 1, includes an analog-to-digital (A/D) converter 10 for periodically converting an incoming analog video signal from a radar transmitter-receiver into a digital signal. Typically A/D converter 10 converts the incoming analog signal into a 6 bit binary word. The output of A/D converter 10 is coupled to an in-phase channel processor (I channel) 12 and a quadrature channel processor (Q channel) 14. Since the processing performed by both the I channel and Q channel processors is identical except for the phase relationship of the correlation signals produced by reference generators 18 and 26, a detailed explanation will only be set forth for the operation of the I channel.

The output of A/D converter 10 is coupled to the input of a multiplier 16 which multiplies the digitized incoming signal with the output of a reference generator 18. The output of the multiplier 16 is coupled to an adder 20 which sequentially combines this output with the output of a shift register 22. The output of adder 20 is coupled to the input of shift register 22 which over a predetermined time interval adds each sequential output of adder 20 to the present contents of each of its storage bins. The output of shift register 22 is also coupled to an output device 24. The outputs of both the I and Q channels are coupled to an output device 24 which vectorially combines these two input signals to produce a magnitude output signal (and phase angle, if desired). The output of output device 24 can either be further processed or directly coupled to a radar display apparatus.

A timing signal produced by clock 25 is coupled to the reference generator and shift register elements of the I channel and Q channel processors and also to the output device 24.

The digital MTI filter performs a correlation function of the incoming video signal to determine if the Doppler shift frequencies of a series of reflected radar signals falls within a predetermined frequency range. This signal correlation must be performed by both an in-phase and a quadrature processing channel to prevent the possibility of having the digital filter fail to detect an incoming signal with a Doppler frequency within the desired range due to the incoming signal having a phase angle 90° out of phase with respect to the phase angle of the reference generator output signal. This potential difficulty is eliminated by using two reference generators, reference generator 18 which generates an in-phase correlation signal, and reference generator 26 which generates a quadrature correlation signal which is 90° phase shifted from the phase angle of the signal from reference generator 18. Other than this 90° phase shift, the function of the I channel and the Q channel processors is identical.

Figure 2:
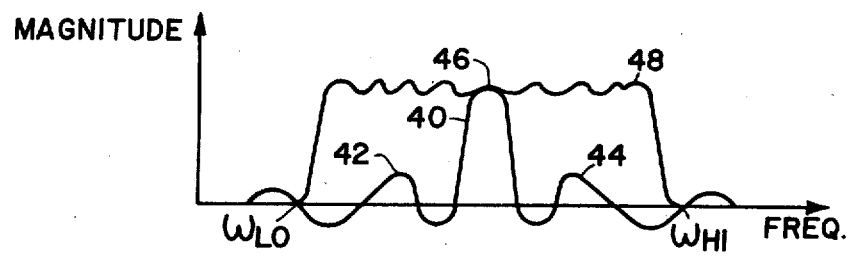
FIG. 2 is a frequency response plot of the output characteristics of both prior art digital filters and the digital filter of the present invention.

The block diagram of this digital MTI filter is similar to prior art devices. The inovation lies in the operation of the reference generators. In prior art devices the reference function for the I channel would be $I_1 = \cos \omega_1 t$ and the reference function for the quadrature channel would be $Q_1 = \sin \omega_1 t$. The frequency response at the output of a prior art filter would be of the form sin $x/x$ as is shown in FIG. 2 by waveform 40. The first side lobes of this response curve (shown by reference numbers 42 and 44) are only 13 dB below the peak response at 46, and subsequent side lobes decrease very slowly with frequency. This filter characteristic has unacceptable side lobes for most MTI radar applications. This type of prior art filter has been made usable by the addition of complex multiplying circuitry to multiply the input video waveform with an amplitude function such as a Taylor distribution. These prior art filters are typically used in filter banks which employ a number of closely spaced filters to cover the frequency region of interest.

The substantial circuitry simplification which is embodied in the present invention and which performs the function previously performed by an elaborate filter bank is based on the recognition that all the weighting and summing operations within the filter and at its output are linear. Therefore, rather than having a bank of filters each of which performs a single-frequency correlation function on the incoming signal, the present invention employs a reference generator which generates a correlation signal which is a combination of a number of discrete frequency correlation signals.

Figure 3:
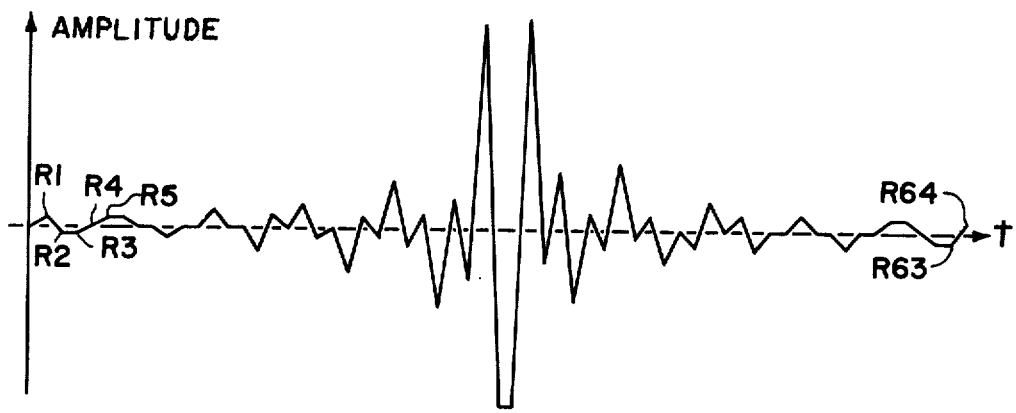
FIG. 3 is a graphical depiction of one possible correlation function adaptable for use with the real channel reference generator of the present invention.

As an example, if it is desired to correlate the incoming signal with a reference generator signal containing 10 discrete correlation frequencies, the period of the composite reference generator signal will be equal to the period of the single lowest frequency correlation signal. Each of the higher frequency correlation signals will then be plotted to begin in-phase with the lowest frequency correlation signal and will terminate at the end of a single period of oscillation of the lowest frequency correlation signal. When all 10 desired correlation frequencies have been plotted they will be graphically added or combined into a single composite correlation waveform. This plotting and summing is a one-time design operation and is typically performed by a digital computer. A separate set of correlation waveforms are plotted to derive both the in-phase and the quadrature channel reference generator waveforms. FIG. 3 shows a typical plot of an I channel reference generator signal composed of the sum of 10 discrete sinusoidal correlation frequencies.

The correlation operation is performed over a designated number of receiving cycles referred to as a "frame" or a correlation interval. Each receiving cycle is associated with a single transmitted pulse. Each receiving cycle is subdivided into a number of range gate intervals.

Figure 4:
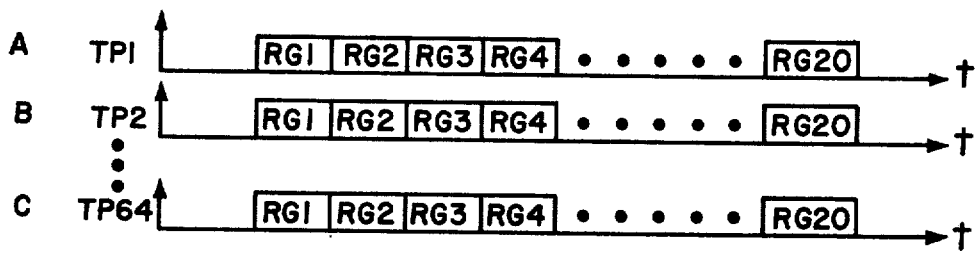
FIG. 4 is a timing diagram illustrating the operation of the invention system.

The operation of the digital MTI filter as shown in FIG. 1 can best be understood by describing the operation of one preferred embodiment. Let us assume that the digital MTI filter has a correlation interval or frame composed of 64 receiving cycles. At the end of each frame the filter generates an output at the output device 24. FIG. 4 shows that in this embodiment for each transmitted pulse (TP) each receiving cycle is subdivided into 20 discrete range gate intervals (labelled RG 1-20). The video input signal is sampled and converted to a single binary word by A/D converter 10 during each range gate interval. Since in this example 64 receiving cycles constitute a single frame it is necessary to divide the reference signal produced by reference generator 18 into 64 discrete digital reference pulses. This is shown in FIG. 3 by reference values R1, R2, R3 . . . R64. A binary word representative of the magnitude of each of these discrete digital reference pulses is set into a read only memory (ROM) which is the primary element of reference generator 18. The binary word produced by A/D converter 10 is transmitted to multiplier 16 where it is multiplied with the output of reference generator 18. During the first receiving cycle (associated with TP1), the first reference value R1 is multiplied with each of the digital output pulses of D/A converter 10 produced during range gate intervals RG1-RG20. During the second receiving cycle the second reference value R2 is multiplied with each of the digital output pulses of D/A converter 10 produced during range gate intervals RG1-RG20. This sequence continues through all of the 64 receiving cycles which constitute one correlation frame.

Figure 5:
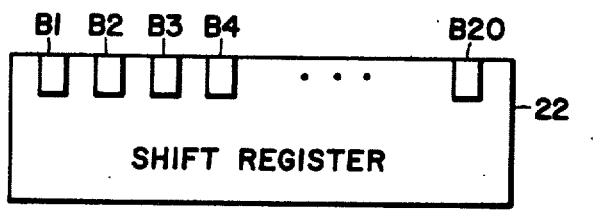
FIG. 5 is a diagrammatic representation of the shift register used in a single channel of the digital filter.

The discrete digital outputs from multiplier 16 are sequentially accumulated in shift register 22 which is shown in more detail in FIG. 5. Shift register 22 is a recirculating shift register which has a number of data storage bins, shown as B1, B2, . . . B20, equal to the number of range gate intervals. Since in the present example each receiving cycle is divided into 20 range gate intervals shift register 22 must have 20 storage bins. At the end of TP1 each of the storage bins of shift register 22 will have received a single input from adder 20.

Figures 6, 7:
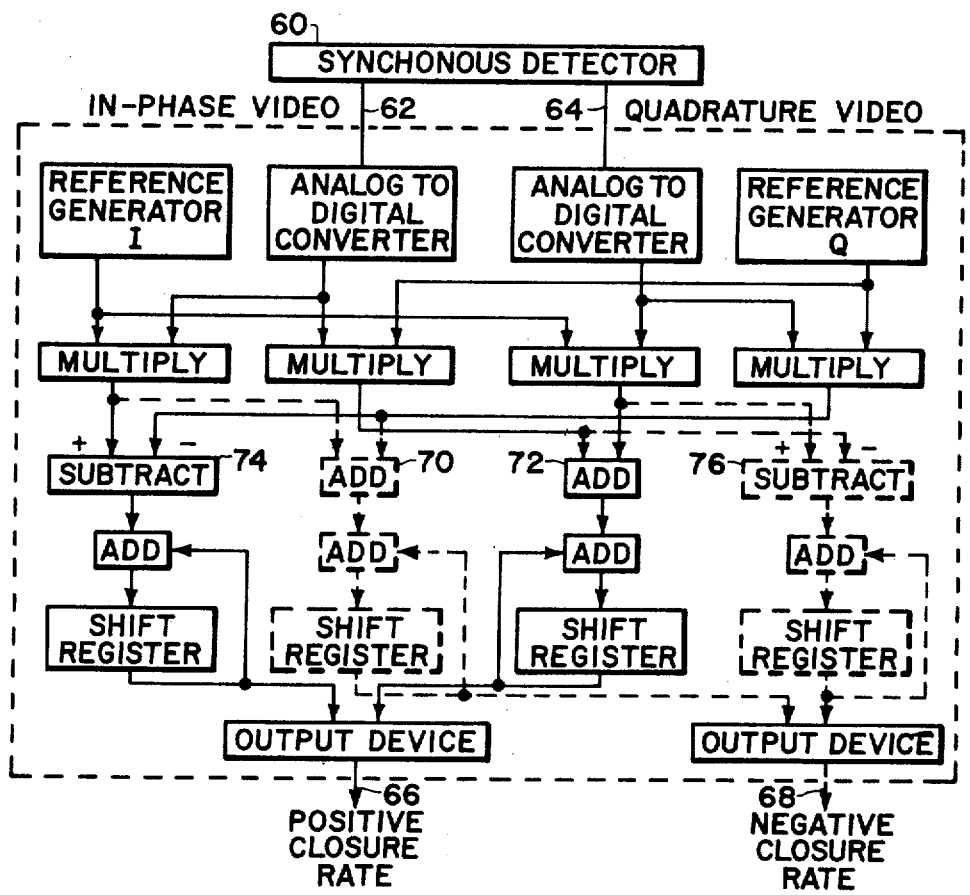
FIG. 6 is a table illustrating the systematic accumulation of correlated data into the recirculating shift register of the present invention.
FIG. 7 is a generalized block diagram of a more elaborate hardware embodiment of the invention where both in-phase and quadrature components of the incoming video signal are available.

FIG. 6 illustrates in more detail the exact sequence of events which occurs during each receiving cycle. The left hand column of the table designates the transmitted pulse number, TP1 through TP64. One receiving cycle is associated with each transmitted pulse. The right hand side of the table displays the content of each shift register bin during each receiving cycle defined by TP1–TP64. During the receiving cycle defined by TP1 bin 1 will accumulate and store the product of R1 and the digital word received during interval RG1. (For simplicity the digital word received during interval RG1 will also be referred to as RG1). After the receiving cycle defined by TP2 the contents of bin 1 will contain the sum: RG1·R1 + RG1·R2. After each subsequent receiving cycle the contents of bin 1 will accumulate further data as a function of the received signal picked up during range gate interval RG1. At the end of the receiving cycle associated with TP64 it can be seen that a single complete correlation of the unknown incoming signal will have been performed. Since shift register 22 circulates each bin once during each receiving cycle, it will have completed 64 cycles at the end of one correlation frame. At the end of one frame of 64 receiving cycles, the output device 24 will generate a series of 20 sequential digital outputs representative of the accumulated contents of each of the 20 bins of the shift register 22. In the two channel digital filter this composite sequential digital output signal from the output device 24 will be representative of the combined magnitudes of the I channel and Q channel output signals. As the content of each bin of each shift register is read out by the output device 24 a clocking signal causes the content of each bin to be zeroed out so that the shift registers will be prepared to begin a new correlation process immediately.

Since this particular reference generator signal is the sum of 10 separate sinusoidal correlation signals it can be seen from FIG. 6 that the content of each shift register bin at the end of each frame represents the signal correlation during that particular range gate interval. Thus a single digital MTI filter has performed a correlation function which would normally have been performed by a bank of 10 discrete prior art filters.

The frequency response curve of this broad band digital MTI filter is shown in FIG. 2 by reference number 48. As compared with the filter characteristics of a typical single channel MTI filter shown by waveform 40 it can be seen that the filter characteristics of the digital MTI filter has substantially reduced side lobes and far steeper filter skirts.

Although the digital MTI filter shown in FIG. 1 will only produce information sufficient to determine whether or not a Doppler shift within a predetermined range is present and will not provide information sufficient to determine what amount of Doppler shift is present, this simple "yes" or "no" information is fully adequate to perform the function of eliminating non-moving and low velocity targets from a radar MTI display.

FIG. 7 shows a further embodiment of the digital MTI filter for use with a coherent radar transmitter-receiver. The coherent radar transmitter-receiver shown has a synchronous detector 60 which provides an in-phase video input signal at conductor 62 and a quadrature video input signal at conductor 64. In this case, the operation of multiplying the input video previously described becomes a vector multiplication. If the subscripts $r$ and $v$ are used to denote the reference generator signal and the video input signal respectively, then the product of the in-phase video signal (I) and the quadrature video signal (Q) is given by:

$$\text{Product} = (Iv + jQv)(Ir + jQr) = IvIr - QvQr + jIvQr + jQvIr$$

The output associated with the product stated above is obtained at output conductor 66. Any output at output conductor 66 indicates the presence of a positive closure rate target for the particular range bin with which the received signal is associated.

There is another property of this more complicated digital MTI filter which may be exploited if desired. Assume that the digital filter has been designed to detect signals having a frequency range lying between $\omega_{LO}$ and $\omega_{HI}$ and that this frequency range corresponds to Doppler shifts associated with closing targets. Then a digital filter covering the image frequency range, which would correspond to targets having a negative closure rate or a negative Doppler shift, could be synthesized by:

$$\text{Image Frequency Product} = (Iv + jQv)(Ir - jQr) = IvIr + QvQr - jIvQr + jQvIr$$

Each of the four terms of this product is the same as in the positive closure rate digital filter except for sign. Therefore, the image frequency filter may be synthesized without additional multiplications. The added circuitry necessary to produce this image frequency product is shown by dotted lines in FIG. 7, and output conductor 68 is used to obtain output data associated with negative closure rate targets.

This more complex digital MTI filter is essentially a combination of two of the devices shown in FIG. 1. These two digital filters are interconnected in a special way with the addition of two "add" logic devices (shown by reference numbers 70 and 72) and two "subtract" logic devices (shown by reference numbers 74 and 76). Also, only a single reference generator is needed for each of the two I channels and for each of the two Q channels.

It will be apparent to those skilled in the art that the disclosed digital filter may be modified in numerous ways and may assume many embodiments other than the preferred forms specifically set out and described above. For example, this digital filter could be used to detect either the presence or absence of frequencies within a predetermined range for controlling the speed or frequency of some other device. The digital filter could be set to shut down an electric motor whenever the rotational frequency of that motor fell outside of a certain desired range identified by the pass-band of a digital filter. Similarly, the digital filter could be used to monitor the 60 cycle line frequency of the output of a public utility generating station to either sound an alarm or shut down a generator whenever the line frequency deviated a certain limited amount from the desired 60 cycle output frequency. Accordingly, it is intended by the appended claims to cover all such modifications of the invention which fall within the true spirit and scope of the invention.

We claim:

1. A digital filter for generating a frequency domain output signal from an incoming signal arriving in successive receiving cycles when the incoming signal has any frequency component lying within the pass-band of said digital filter, comprising:
   a. means for generating a timing signal;
   b. analog-to-digital converter means responsive to said timing signal for converting the incoming signal into digital input pulses, wherein each digital input pulse corresponds to a range gate interval;
   c. reference generator means responsive to the timing signal for providing a train of digital reference pulses for each of the successive receiving cycles, wherein a predetermined number of the successive receiving cycles form a frame and wherein the amplitude of each train of digital reference pulses is determined by a correlation function;
   d. means for multiplying each digital reference pulse with each digital input pulse to generate a train of discrete digital outputs for each receiving cycle; and
   e. means responsive to the timing signal for accumulating the discrete digital outputs from said multiplying means and generating the frequency domain output signal for each frame of digital reference pulses.

2. The apparatus according to claim 1, wherein said reference generator means further includes a memory means for retaining a predetermined number of selected samples of said correlation function.

3. The apparatus according to claim 2, wherein said memory means further includes a read only memory.

4. The apparatus according to claim 1, wherein said accumulating means includes digital integrating means responsive to the timing signal for summing in succession over a complete frame of receiving cycles the discrete digital outputs produced during each receiving cycle.

5. The apparatus according to claim 4, wherein said digital integrating means includes a recirculating shift register having a number of storage bins corresponding to the number of range gate intervals into which each of said receiving cycles is subdivided, means for resetting the contents of said storage bins of said recirculating shift register to zero at the end of each frame of receiving cycles, and means for switching out the accumulated contents of each storage bin of said shift register at the end of each frame of digital reference pulses.

6. A digital filter having I and Q processing channels for generating a frequency domain output signal in response to an incoming signal arriving in successive receiving cycles whenever the incoming signal has a frequency component lying within the pass-band of said digital filter, comprising:
   a. means for generating a timing signal;
   b. analog-to-digital converter means responsive to said timing signal for converting the incoming analog signal into digital input pulses; wherein each digital input pulse corresponds to a range gate interval; and
   c. wherein said I channel comprises:
      1. reference generator means responsive to the timing signal for providing a train of I channel digital reference pulses for each of the successive receiving cycles, wherein a perdetermined number of the successive receiving cycles form a frame and wherein the amplitude of each train of I channel digital reference pulses is determined by an I channel correlation function;
      2. means for multiplying each of the I channel digital reference pulses with each of the digital input pulses to generate a train of I channel discrete digital outputs for each receiving cycle;
      3. means responsive to the timing signal for accumulating the I channel discrete digital outputs from said multiplying means; and
   d. wherein said Q channel comprising:
      1. reference generator means responsive to the timing signal for providing a train of Q channel digital reference pulses for each of the successive receiving cycles, wherein a predetermined number of the successive receiving cycles form a frame and wherein the amplitude of each train of Q channel digital reference pulses is determined by a Q channel correlation function;
      2. means for multiplying each Q channel digital reference pulse with each digital input pulse to generate a train of Q channel discrete digital outputs for each receiving cycle;
      3. means responsive to the timing signal for accumulating the Q channel discrete digital outputs from said multiplying means; and
   e. means for combining the outputs from said first and said second accumulating means to generate the single frequency domain output signal for each frame of digital reference pulses.

7. The apparatus according to claim 6, wherein said reference generator means further inludes a memory means for retaining a predetermined number of selected samples of either said I channel correlation function or said Q channel correlation function.

8. The apparatus according to claim 7, wherein said memory means further includes a read only memory.

9. A digital filter for generating first and second frequency domain output signals from an incoming signal arriving in successive receiving cycles in response to the incoming signal having a frequency component lying within the pass-band of said digital filter, wherein the incoming signal has an in-phase and a quadrature component, comprising:
   means for generating said first frequency domain output signal when said incoming signal contains a positive Doppler shift frequency lying within the pass-band of said digital filter; and
   means for generating a second frequency domain output signal when said incoming signal contains a negative Doppler shift frequency lying within the pass-band of said digital filter;
   wherein said means for generating a first frequency domain output signal includes means for generating a timing signal, analog-to-digital converter means, reference generator means, multiplying means, accumulating means, and combining means operatively coupled to process the incoming signal according to the following relationship:

positive Doppler shift = $Iv_r - Qv_{Qr} + jIv_{Qr} + jQv_{Ir}$;

and wherein said means for generating a second frequency domain output signal includes means for generating a timing signal, analog-to-digital converter means, reference generator means, multiplying means, accumulating means, and combining means operatively coupled to process the incoming signal according to the following mathematical relationship:

negative Doppler shift = $IvIr + QvQr - jIvQr + jQvIr$, wherein I and Q correspond to the in-phase and quadrature components of the incoming signal and where $r$ and $v$ correspond to the reference generator signal and the incoming video signal respectively.

* * * * *